Patented Oct. 15, 1935

2,017,606

UNITED STATES PATENT OFFICE 2,017,606

ANTHRAX ANTIGEN PREPARATION AND PRODUCT

John Reichel, Philadelphia, and Joseph Edward Schneider, Yeaden Borough, Pa., assignors to Sharp & Dohme, Incorporated, Philadelphia, Pa., a corporation of Maryland No Drawing. Application December 24, 1932, Serial No. 648,823

13 Claims. (Cl. 167—78)

This invention relates to a new anthrax antigen preparation for use in increasing the resistance of animals against infection with virulent anthrax bacilli and which is itself incapable of infecting the animal injected, and to a method of producing such preparation.

Cultures and vaccines of living or dead anthrax bacilli have been proposed and to some extent used as immunizing agents. In preparing such cultures and vaccines, anthrax bacillus cultures have been grown on and in artificial culture media and the growth obtained used in various forms, such as in the form of live culture vaccines, with or without spores, in the form of products in which the bacilli have been killed by heat or by chemical agents such as the mercurials, phenol, formalin and the like, etc. Live virulent cultures are also used in the injection of animals for the purpose of creating oedematous swellings from which the juices are subsequently recovered and sterilized by filtration or by other means and used as aggressions for the purpose of immunization.

The products heretofore used and proposed for immunization have their origin in anthrax bacillus cultures. The products made from these cultures have included the bacilli themselves and the by-products of their growth, as well as portions of the culture medium on or in which they have been grown and such substances as normal serum used to support and promote the culture and growth of the bacilli in the culture medium by providing additional growth factors. It has not been known which of these various substances included the active antigenic or protective substances, nor has it been known what if any effect other substances present, other than the active antigenic or protective substances, had on the action of such products as immunizing agents.

As a result of our investigation, we have succeeded in preparing a new anthrax antigen preparation in the form of an active and potent product which contains what we believe to be the active principle in causing or increasing the resistance of animals against natural and artificial infection with virulent anthrax bacilli, and which is free or substantially so from interfering or injurious constituents.

Our new product consists of the massed anthrax bacilli freed from the soluble by-products of their growth and from the culture medium in which they are grown. We have found that the fluid in which the bacilli are suspended or with which they are associated includes or contains specific soluble substances such as the carbohydrates or polysaccharides which, in animal protection tests, were found to be of limited protective or antigenic value in themselves, and which, in combination with the massed bacilli gave a product of lower antigenic value than the massed bacilli freed from such associated soluble constituents.

As a result of our investigation, we have developed a new process of producing the new anthrax antigen product consisting of the massed anthrax bacilli freed or substantially so from their by-products and culture media.

In carrying out our process we select an anthrax culture which grows well in or on artificial culture media, and we proceed to grow such culture at a temperature which insures an active growth of the bacilli. Preferably the culture is grown at a temperature higher than the usual incubation temperature of about 37° C., namely, at a temperature of approximately 43° C., for several days to secure the maximum growth of bacilli with the minimum spore development. We have found that a heavy growth well adapted for our purpose is obtained by growing the bacilli on the surface of solid culture media from which the growth can readily be removed by washing the same from the surface by the addition of limited amounts of normal salt solution or water including such chemical agents as have the property of hardening and fixing the bacterial proteins, such as alcohol, acids like acetic acid, and salts such as ammonium sulfate, or formalin which we have used in approximately 2% strength. These substances, aside from hardening, fixing or precipitating the proteins, also kill the bacilli.

The bacilli can also be grown in liquid culture media, although we have found the growth on the surface of solid culture media more advantageous.

When a liquid culture medium is employed, chemical agents are similarly used, as above explained, for hardening or fixing the bacterial proteins and killing the bacilli.

As a result of the growth of the bacilli, there is obtained a suspension of the bacilli which is subsequently treated for effecting a massing of the bacilli, for example, by the use of a centrifuge, to effect separation of the bacilli in the form of a mass from the supernatant fluid with the chemical agent or agents in it. The fluids so separated include the specific soluble substances, such as the carbohydrates or polysaccharides, which we have found objectionable and which we remove.

The massed bacilli, separated from the liquid culture medium, or from the surface of the solid culture medium, and obtained in the form of a mass, are further purified, for example, by adding normal salt solution in which the bacilli are resuspended, and from which they are subsequently remassed, e. g. by centrifuging, to again remove from the bacilli the supernatant fluids with such traces or small amounts of the specific soluble substances which are thus separated from the mass. The resuspension of the bacilli in normal salt solution and the remassing of the bacilli can be repeated three or four times, if necessary, to insure the removal of all or substantially all of the specific soluble substances, thereby giving the bacilli in a form in which they are free or substantially so not only from culture medium but also from their soluble by-products, such as carbohydrates or polysaccharides, etc.

After the massed bacilli are thus washed and freed from such associated constituents and from added chemical agents, the bacilli are ready for suspension in normal salt solution, with or without a preservative such as the mercurials, phenol or formalin, and are then ready for use. Inasmuch as the massed bacilli have been freed from the specific soluble substances in the fluids of the culture media on or in which the bacilli have been grown and in the normal salt solution used in massing and remassing the bacilli, it is possible to include a definite number of bacilli in each dose and to further standardize the dose by chemical analysis for the protein content.

We have established, by animal experimentation, that approximately 25,000 million bacilli will include approximately 1.62 milligrams of protein, and that by suspending approximately 25,000 million bacilli to the cubic centimeter in normal salt solution and preserving the solution with any of the usual chemical germicides used for preserving such products, about 2 cubic centimeters if used for injection will impart substantially increased resistance to the animals injected.

We are led to consider the protein content of the bacilli as the active and potent anthrax antigenic substance, and the results obtained with this preparation indicate that it has a markedly superior effect in increasing the resistance to infection of the animals injected with it.

We have found, for example, that, where the control animals used in animal protection tests were injected with an infective dose of anthrax bacilli and where the greater part of the animals so injected died as a result of such tests, the use of the new preparation of the present invention increased the resistance of the animals sufficiently so that by far the greater portion of the animals survived an infective dose of the anthrax bacilli. In other words, where most of the control animals died of anthrax from the infective dose employed, the increased resistance or active immunity imparted by the injection of the new product of the present invention protected the majority of the animals infected.

Moreover, comparative tests made with the use of the new product, in comparison with products in which the bacilli were associated with culture medium and soluble by-products, showed a materially increased resistance or active immunity with the new product.

The new massed bacilli product can be further processed to break down the physical shape of the bacilli and to convert the product into a more or less clear solution or colloidal suspension, for example, by digestion of the product by the use of certain digestive ferments or by the action of certain chemical agents such as acids or alkalies, in order to release the specific active anthrax protein and enable it to be used as anthrax antigen in colloidal suspension. Such product can also be standardized on the protein content to provide a definite amount of protein per cubic centimeter or per dose.

It will thus be seen that the present invention provides a new and improved process of producing an anthrax antigen preparation in which the culture of the bacilli is treated to kill the bacilli and to separate them into a massed form from associated culture medium and soluble by-products, etc., and in which the bacilli are thereby made available in the form of a concentrated product capable of standardization of dosage.

It will also be seen that the present invention provides a new and improved anthrax antigen preparation or product in the form of a concentrated or massed product of dead anthrax bacilli, freed from associated culture medium and soluble associated by-products, etc., and which, from its action, we consider to contain the active principle of the anthrax bacilli. The new product forms a valuable immunizing preparation for animals, such as sheep, swine, goats, horses, mules and cattle, etc.

We claim:

1. The method of preparing an anthrax antigen product which comprises growing the bacilli with the aid of a suitable culture medium, separating the bacilli from the culture medium and from free polysaccharides resulting from the growth of the bacilli in the form of a concentrated mass of the bacilli, and suspending the final product to a definite bacillary count or protein content, the bacilli having been killed prior to the suspension of the final product.

2. The method of preparing an anthrax antigen product which comprises growing the bacilli with the aid of a suitable culture medium, killing the bacilli, and separating the bacilli from the culture medium and from free polysaccharides resulting from the growth of the bacilli in the form of a concentrated mass of the bacilli.

3. The method of preparing an anthrax antigen product which comprises growing the bacilli in a liquid culture medium, killing the bacilli, and separating the bacilli from the culture medium and from free polysaccharides resulting from the growth of the bacilli in the form of a concentrated mass of the bacilli.

4. The method of preparing an anthrax antigen product which comprises growing the bacilli on the surface of a solid culture medium, separating the bacilli from the surface of such medium, killing the bacilli, separating the bacilli from free polysaccharides resulting from the growth of the bacilli, and massing the separated bacilli in the form of a concentrated mass.

5. The method of preparing an anthrax antigen product which comprises growing the bacilli with the aid of a suitable culture medium, treating the bacilli with a chemical agent which will kill the bacilli and which will harden or fix the proteins thereof, and separating the bacilli from the culture medium and from free polysaccharides resulting from the growth of the bacilli in the form of a massed concentrate.

6. The method of preparing an anthrax antigen product which comprises growing the bacilli with the aid of a suitable culture medium, killing the bacilli, separating the bacilli in the form of a massed concentrate, and treating the massed concentrate to remove admixed soluble by-products and culture medium therefrom.

7. The method of preparing an anthrax antigen product which comprises growing the bacilli with the aid of a suitable culture medium, treating the bacilli with a chemical reagent which will kill the bacilli and harden or fix the proteins thereof, separating the bacilli in the form of a massed concentrate, and treating the massed concentrate to remove admixed soluble by-products and culture medium therefrom.

8. The method of preparing an anthrax antigen product which comprises growing the bacilli with the aid of a suitable culture medium, killing the bacilli, separating the bacilli in the form of a massed concentrate, suspending the mass one or more times in water or a salt solution and again separating the bacilli in the form of a mass to obtain the mass substantially freed from soluble by-products and culture medium.

9. The method of preparing an anthrax antigen product which comprises growing the bacilli with the aid of a suitable culture medium, treating the bacilli with a chemical reagent which will kill the bacilli and which will harden or fix the proteins thereof, separating the bacilli from the culture medium and from free polysaccharides resulting from the growth of the bacilli in the form of a massed concentrate, washing the concentrated mass with water or salt solution, and suspending the end product to a definite bacillary count or protein content.

10. The method of preparing an anthrax antigen product which comprises growing the bacilli on the surface of a solid culture medium, removing the bacilli from such surface to form a liquid suspension thereof, treating the bacilli with a chemical reagent which will kill the bacilli and which will harden or fix the proteins thereof, separating the bacilli from the liquid medium in the form of a concentrated mass, washing the concentrated mass to remove associated soluble constituents and culture medium and resuspending the final product to a definite bacillary count or protein content.

11. An anthrax antigen comprising massed dead anthrax bacilli substantially free from free polysaccharides resulting from the growth of the bacilli and from culture medium.

12. An anthrax antigen comprising the proteins of dead anthrax bacilli, substantially free from water soluble by-products and culture medium.

13. An anthrax antigen comprising massed dead anthrax bacilli substantially free from free polysaccharides resulting from the growth of the bacilli and from culture medium, the proteins of said bacilli being hardened or fixed.

JOHN REICHEL.
JOSEPH EDWARD SCHNEIDER.